Feb. 22, 1966     N. A. PIERSON     3,236,743
APPARATUS FOR PROCESSING WET GARBAGE
Filed Jan. 22, 1962
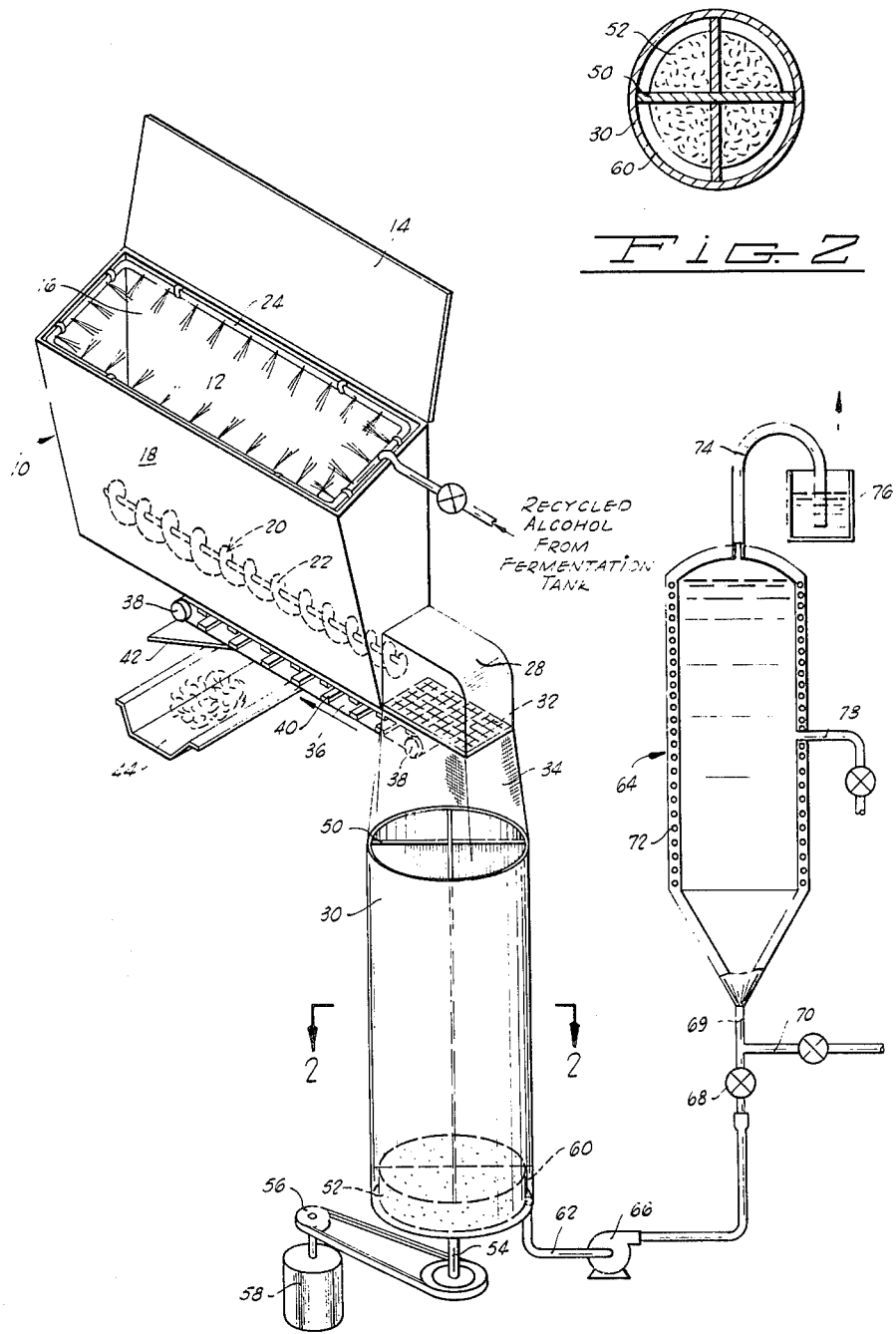
INVENTOR.
NORMAN A. PIERSON
BY
ATTORNEYS

United States Patent Office 3,236,743
Patented Feb. 22, 1966

3,236,743
APPARATUS FOR PROCESSING WET GARBAGE
Norman A. Pierson, P.O. Box 755, Norman, Okla.
Filed Jan. 22, 1962, Ser. No. 167,526
5 Claims. (Cl. 195—138)

This invention relates to a system and apparatus for processing refuse material in a sanitary manner to convert the refuse to useful products. More particularly, but not by way of limitation, the present invention relates to a method and apparatus for treating wet garbage, such as table scraps and the like, to convert the garbage to useful products through a process of fermentation.

In the collection and disposal of municipal refuse, very large quantities of so-called "wet garbage" are accumulated and must be disposed of in a sanitary and permanent manner. Wet garbage generally consists of organic material having a relatively high moisture content and includes particularly, table scraps and other household wastes which are generally placed in the garbage can or refuse disposal container of the usual domestic household. Because of the warm, moist environment constituted by such wet garbage, it generally has a greater pathogen content than other types of garbage and refuse which are collected in municipalities and therefore presents a substantially greater problem in its handling due to the safety precautions and sanitary measures which must be observed to protect collecting and handling personnel. Existing municipal sanitation laws limit to some extent the types of steps which may be taken in handling the refuse.

The disposal of wet garbage has previously constituted a problem, not only because of the health and sanitation hazards which exist, but also because this type of refuse is too wet to burn, and is generally not water soluble. Efficient disposal by incineration and dumping in deep water disposal areas is thus impossible or extremely difficult. In general, except for a system which has recently been developed for successfully composting all types of municipal refuse, the permanent disposition of wet garbage in a safe and economic manner has not been devised.

The present invention provides a system and apparatus for processing refuse materials, and in particular wet garbage, so that a substantial portion of the beneficial chemical content of such wet garbage may be recovered or converted to useable compositions. In one of its broader aspects, the invention comprises treating the wet garbage to place it in a form most suitable for the progression of fermentation conditions in the garbage so that the protein content of the material may be boosted. Additionally, a number of valuable organic chemicals may be isolated from the wet garbage following the fermentation process by suitable chemical and physical separation means.

The apparatus for practicing the process broadly comprises a hopper disposed for receiving the refuse material which is to be subjected to the process, a perforated conduit extending around the hopper for injecting a pathogen-killing chemical, such as alcohol, into the refuse contained in the hopper; an auger conveyor in the bottom of the hopper for moving the refuse therein toward one end of the hopper and simultaneously grinding the refuse into a soft, moist slurry or mush; a discharge passage at the end toward which the refuse is being moved for permitting the refuse to be discharged therefrom; grinding means positioned under the discharge passage for receiving the refuse slurry as it gravitates from the hopper and for further comminuting the refuse; means for removing magnetic metals from the slurry as it gravitates through the discharge opening; a fermentation tank for containing the comminuted refuse slurry while the refuse ferments; a conduit interconnecting the grinding means and the fermentation tank; and a pump associated with the conduit for pumping the refuse slurry from the grinding means into the fermentation tank. An important feature of the apparatus used in the system is the grinding means which is employed for further reducing the particle size of the refuse contained in the slurry discharged through the discharge passageway of the receiving hopper. The grinding means comprises a large vertical, generally cylindrical tank which is partitioned into a plurality of compartments by vertical partitions. At the bottom of the grinding chamber is located a flat grinding rock which is rotatably mounted in the chamber for rotation about the vertical axis of the chamber. This grinding stone is mounted in juxtaposition to the lower edge of each of the vertical partitions and cooperates with the partitions for comminuting or reducing the particle size of the refuse material.

In accordance with the foregoing description, it is a major object of the present invention to provide an apparatus and method for receiving raw, wet garbage or similar refuse and converting such refuse to useful products.

A further object of the present invention is to provide a system for economically disposing of wet garbage in a safe and sanitary manner.

A further object of the present invention is to provide a wet garbage processing system which is relatively simple in construction and is characterized by a long and trouble-free operating life.

Other objects and advantages of the present invention will become apparent as the following disclosure is read in conjunction with a perusal of the accompanying drawings which illustrate the invention.

In the drawings:

FIGURE 1 is a perspective view of the novel apparatus which may be utilized in practicing the process of the present invention.

FIGURE 2 is a view in section taken along lines 2—2 of FIGURE 1.

Referring now to the drawings in detail, and particularly to FIGURE 1, reference character 10 designates a receiving hopper into which the wet garbage material which has been collected throughout a municipality may be dumped from the trucks used in such collections. The hopper 10 is preferably provided with an opening 12 at the top which is inclined to the horizontal to facilitate the more efficient deposition of the wet garbage material therein. A pivoted or hinged top 14 is provided which is dimensioned to fit tightly over the opening 12 and thereby prevents the accessibility of the refuse or wet garbage in the hopper 10 to flies and other vermin.

The hopper 10 has a substantially vertical rear wall 16 and a front wall 18 which is inclined toward the rear wall so that the hopper is tapered from the top to the bottom thereof. Adjacent the bottom of the hopper is a suitable conveyor 20 for conveying the wet garbage toward one end of the hopper. Preferably, the bottom of the hopper and the conveyor 20 are inclined slightly so that the movement of the wet garbage toward one end of the hopper is assisted by gravitation. In the preferred embodiment of the invention illustrated in FIGURE 1, the conveyor 20 comprises an auger-type member having helical threads 22 thereon which continuously move the wet garbage toward the lower end of the hopper and accomplish some comminution of the garbage as it is moved through the hopper. Consequently, when the garbage reaches the lowermost end of the hopper, it has been mashed or comminuted into a soft, pasty slurry.

Positioned adjacent to the top of the hopper 10 is a perforated conduit 24 which extends along each side of the hopper and is employed to inject a spray of a pathogen-destroying chemical into the interior of the hopper.

Although other types of materials are also suitable for the purpose of destroying the pathogens in the wet garbage, I prefer to utilize a dilute aqueous ethyl alcohol solution. When ethyl alcohol is employed, a sufficient amount of the alcohol is added to the garbage to bring the alcohol content of the mixture in the bottom of the hopper to between 1½ and 3 percent.

After the slurry in the bottom of the tank has been moved by the auger conveyor 20 to the lowermost end of the hopper 10, the slurry is passed through a discharge passageway 28 and gravitates into a grinder tank 30. In the preferred embodiment of the invention, as the slurry is en route from the hopper 10 to the grinding tank 30, it is passed through a screen or grate 32 positioned in the bottom of the discharge passageway 28 so that any materials too large to be handled by the grinding tank can be withheld from passage thereinto. Also in the preferred embodiment of the present invention, the sanitary handling of the slurry material is effected by enclosing the space between the discharge passageway 28 and the grinding tank 30 with a screen 34 which prevents flies or other pests from contacting the material as it passes through this space.

In order to remove magnetic metals from the slurry prior to the deposition of the slurry in the grinding tank 30, a moving belt 36 which passes over a pair of spaced rollers 38 and carries at its inner side magnets 40 is positioned under the hopper 10 adjacent the lowermost end thereof. One end of the belt 36 protrudes slightly beneath the grate 32 of the discharge passageway 28 and, in this position, is contacted by the slurry material as it gravitates through the grate into the grinding tank 30. With this arrangement, the magnetic materials contained in the wet garbage are first attracted to the bottom of the hopper 10 by the juxtaposition of the magnets just beneath the hopper. These magnetic materials are then pushed by the slurry advancing toward the lowermost end of the hopper to the inner edge of the discharge passageway 28. Immediately after passing out of the hopper 10, these magnetic materials contact the belt 36, and are caused to adhere thereto by the magnets 40 carried on the inner surface of the belt. As the magnetic materials are carried along by the belt 36, they ultimately come in contact with a scraper or doctor blade 42 which is positioned in a scraping position with reference to the outer surface of the belt. The magnetic materials are thus scraped off the belt 36, and are allowed to gravitate into a suitable container 44. They may then be disposed of in any desirable fashion.

After the magnetic materials have been removed from upon the belt 36, and such large, relatively hard materials such as bones, chunks of plastic, etc., have been screened from the slurry by the grate 32, the slurry is deposited in the grinder tank 30. This tank is a large cylindrical container which is partitioned into a series of compartments by a plurality of vertically extending partitions 50. These partitions 50 extend diametrically across the grinder tank 30 and also extend downwardly into the tank and terminate at their lower ends, with the lower edges in vertically spaced relation from the bottom of the tank.

Rotatably secured in the bottom of the tank immediately below the partitions 50 is a flat disc-shaped grinding member 52. The grinding member 52 is constructed with an abrasive upper surface so that the slurry material which is deposited in the grinding tank 30, and which comes to rest upon the grinding member 52 will be further comminuted or pulverized by the rapid rotation of the grinding member. The spinning or rotating motion of the grinding member 52 is imparted thereto through the medium of an axial shaft 54 which is connected through suitable gearing 56 to a motor 58. From the description thus far, it will be apparent that a substantial grinding action is accomplished by the rapid rotation of the grinding member 52, and by the cooperation between the upper surface of the grinding member 52 with the vertical partitions 50 which develops a shearing action in the slurry deposited in the grinding tank 30.

A circumferential space 60 is provided around the outer periphery of the grinding member 52 and the ground slurry material is permitted to gravitate into the space 60 as the grinding member 52 is rotated. A conduit 62 is connected at one of its ends to the grinding tank 30 and communicates with the circumferential space 60. The conduit 62 is connected at its other end to a large fermentation tank 64, and a pump 66 is positioned in the conduit 62 for pumping the slurry from the grinding tank 30 into the fermentation tank 64. The slurry passes through a check valve 68 which is disposed in the neck 69 at the lower end of the fermentation tank 64 and which permits one way flow into the fermentation tank 64 while preventing the escapement of any of the materials contained within the fermentation tank.

The construction of the fermentation tank 64 is such that the fermentation of the material therein is accomplished in a most expeditious manner. The lower end of the tank is of generally conical configuration so that a more efficient separation of certain strata which develop in the tank during the process of fermentation may be accomplished. A discharge line 70 is connected to the neck 69 of the fermentation tank 64 to permit certain materials to be removed from the fermentation tank after the process of fermentation has been completed. The walls of the fermentation tank 64 are hollow and contain a purality of convolutions of a heating conduit 72 which carries a suitable medium such as steam or the like for heating the contents of the fermentation tank as necessary to promote the most efficient and rapid fermentation. In general, however, the temperature which may be most desirably utilized in the fermentation tank is relatively low so that the increase in the protein content of the material in the fermentation tank is not retarded by the effect of high temperature on bacterial growth and reproduction.

A suitable discharge line 74 is connected to the top of the fermentation tank 64 and communicates with the interior thereof so that carbon dioxide, ammonia or other gases evolved during the fermentation process may be vented from the tank and the buildup of excessive pressure within the tank prevented. The discharge line 74 is passed into a water bath 76 and terminates below the surface of the water contained therein. The gases which are discharged from the discharge line 74 are thus scrubbed before being vented to the atmosphere. This removes any noxious bacteria or other organisms which may be entrained in the vented gases.

A third discharge line 7 is connected to a medial portion of the fermentation tank 64 to permit the components of the fermentation mixture which stratify at the center of the fermentation tank to be drained therefrom. Both the discharge conduits 70 and 78 lead from the fermentation tank 64 to suitable chemical and/or physical separation apparatus where the isolation of various useful components produced in the fermentation is effected. One of these components will in each instance be a relatively low molecular weight alkanol produced during the fermentation. In addition to its other well known valuable uses, this alcohol may be recycled from the fermentation tank 64 to the perforated conduit 24 at the top of the hopper 10 for use as the pathogen-destroying chemical which is added to the wet garbage in the hopper.

*Operation*

To summarize the operation of the method and apparatus of the present invention, the wet garbage which is to be processed is initially deposited in the hopper 10. The garbage, of course, gravitates to the bottom of the hopper, and in that position is inaccessible to flies, rats and other vermin by virtue of the closure of the pivoted top 14. A substantial amount of alcohol or other pathogen-destroying chemical is added to the wet garbage in the bottom of the hopper 10 by means of the perforated conduit 24. It will be noted that the jetting streams of the pathogen-destroying chemical are directed toward the opposed sides of the hopper 10 as they are ejected from the perforations of the conduit 24. This permits the inner walls of the hopper 10 to be continuously washed down by the pathogen-destroying chemical, and prevents accretion of refuse or garbage on the sides of the hopper.

After the refuse has gravitated to the bottom of the hopper 10, it is moved toward the lowermost end of the hopper by the auger conveyor 20. Due to the relatively close proximity of the conveyor 20 to the bottom of the hopper 10 and to the action of the helical threads 22, the wet garbage is mashed and comminuted into a relatively thick paste or slurry. The slurry material, in passing toward the lowermost end of the hopper 10, is subjected to the attractive influence of the magnets 40 carried on the continuous belt 36. Although I have illustrated the magnetic metals removing element of the invention as comprising a plurality of permanent soft iron magnets, it will be apparent to those skilled in the art that electromagnets may be utilized if this should be more desirable.

Before the slurry reaches the grate 32, most of the magnetic materials therein are attracted to and held at the bottom of the hopper 10. They are thus in a position to immediately contact the surface of the continuous belt 36 as they pass out of the hopper 10 and through the grate 32. The remaining magnetic materials will be attracted to the belt 36 as the slurry gravitates through the grate 32 and into contact with the outermost end of the belt. Large materials such as bones, pieces of plastic and other such materials, will be screened from the gravitating slurry by the grate 32.

After the slurry is deposited in the grinding tank 30, it is subjected to the reducing action of the grinding member 52. This member is driven in rapid rotation by the motor 58 in cooperation with the vertical partitions 50 and introduces a substantial shearing action into the body of the slurry contained in the grinding tank 30. In this manner, the slurry is converted to a pumpable material which can be forced by the pump 66 through the conduit 62 into the fermentation tank 64.

The slurry remains in the fermentation tank for a period from 20 to 48 hours. During this time at least three distinct strata form in the fermenting mixture. The uppermost is substantially organic in nature, comprising organic liquids which are immiscible with water and soluble organic solids. The next strata is an aqueous alcohol layer. Finally the bottom layer is a layer of relatively dense solid materials which gravitate to the bottom of the fermentation tank.

During the residence time of the slurry in the tank, the generation of carbon dioxide in the tank will cause the liquid level to rise relatively rapidly. Therefore the tank should usually not be filled to more than two-thirds full. The carbon dioxide which bubbles up through the fermenting slurry is vented to the atmosphere through the water bath 76 and is thus scrubbed to remove any deleterious organisms which may be entrained therein.

In the course of the fermentation process, the bacteria and other microorganisms in the fermenting material reproduce, and as a result of their activity the protein content of the solid material in the fermenting material is boosted or increased. Thus, following the termination of the fermentation period, this high protein solid material may be isolated, such as by vacuum filtration, and mixed with corn starch and other nutrients to make a balanced feed for livestock.

The alcohol generated during fermentation may be separated by fractionation from the other liquids of the fermented mixture, and a portion of it recycled to the hopper 10 for use as a pathogen-destroying agent. Other valuable chemicals are also recovered in the fractionation process.

From the foregoing description, it will be apparent that the present invention provides a very useful and sanitary method and apparatus for economically disposing of wet garbage and similar refuse. Many useful products are recovered as a result of the conversion of the garbage constituents to such products by fermentation.

Although the method and apparatus hereinbefore described may be modified in many respects which will be apparent to those skilled in the art, insofar as such modifications continue to rely upon the basic principles underlying the present invention, they are deemed to be encompassed by the spirit and scope of the present invention except as the same may be necessarily limited by the appended claims.

I claim:
1. Apparatus for fermenting refuse material comprising:
   a hopper for receiving the material;
   conveyor means in the bottom of the hopper for moving the refuse material toward one end of the hopper while converting the refuse to a soft, moist slurry;
   means adjacent the bottom of the hopper for removing magnetic materials from said refuse;
   a discharge passage at one end of the hopper for permitting the refuse to be discharged therefrom;
   grinding means positioned under said discharge passage for receiving the refuse as it gravitates from said hopper and for comminuting said refuse;
   a vertically extending, closed anaerobic fermentation tank having a generally cylindrical upper end and a conical lower end;
   a conduit interconnecting said grinding means and the conical lower end of said closed, vertically extending anaerobic fermentation tank whereby refuse slurry can be introduced to the bottom of said vertically extending fermentation tank with a minimum amount of disturbance to the contents thereof; and
   pump means associated with said conduit for pumping the refuse slurry into said fermentation tank at the conical lower end thereof.

2. Apparatus for fermenting refuse materials comprising:
   a hopper for receiving the material;
   means in said hopper for spraying a liquid into said refuse;
   conveyor means in the bottom of the hopper for moving the refuse material toward one end of the hopper for converting the refuse to a soft, moist slurry;
   a discharge passage at said one end of the hopper for permitting the refuse to be discharged therefrom;
   an elongated endless belt extending under said hopper along the length thereof and extending into said passage at said one end of the hopper;
   a plurality of magnets carried by said belt on the inner, enclosed surface thereof;
   scraping means bearing against the outer surface of said endless belt for removing magnetic materials adhering thereto as a result of the extension of said endless belt into said discharge passage;
   grinding means positioned under said discharge passage for receiving the refuse as it gravitates from said hopper and for comminuting said refuse;
   a closed, anaerobic fermentation tank;
   a conduit interconnecting said grinding means and said closed, anaerobic fermentation tank;
   pump means associated with said conduit for pumping the refuse slurry into said fermentation tank from said grinding means; and
   conduit means interconnecting said fermentation tank with said means for spraying a liquid into the refuse in said hopper.

3. Apparatus for treating garbage comprising:
a generally horizontally extending hopper for receiving the garbage, said hopper having a closable cover thereon;
means in said hopper for spraying a liquid against the internal walls of the hopper;
an aguer conveyor in the bottom of said hopper and extending the length thereof for simultaneously moving the garbage toward one end of the hopper and converting the garbage to a soft, moist slurry;
a discharge passage at said one end of the hopper for permitting the garbage slurry to be discharged therefrom;
screening means across said discharge passage for permitting the garbage to be screened to remove selectively sized objects therefrom;
means outside the hopper and adjacent the bottom of said hopper and extending over a substantial portion of the length of said hopper for removing magnetic materials from said garbage slurry, and for drawing magnetic materials toward the bottom of the garbage moving said hopper, said means for removing magnetic materials including an end portion extending into said discharge passage for collecting magnetic materials moving with said garbage through said discharge passage;
grinding means positioned under said discharge passage for receiving the garbage slurry as it moves from said hopper through said discharge passage and for further comminuting said garbage slurry, said grinding means comprising:
    a generally vertically extending tank,
    vertically extending partitions in said tank extending through said tank in vertical planes and terminating with their lower edges spaced above the bottom of said tank, and
    a flat surfaced, disc-shaped member in the bottom of said tank mounted for rotation in said tank about the vertical axis of said tank and having its flat surface adjacent the lower edges of said vertical partitions and cooperating with said partitions to effect said further comminution of said garbage slurry, said disc-shaped member being of lesser diameter than said tank to define with said tank an annulus between the disc-shaped member and the walls of said tank,
a closed anaerobic, vertically extending fermentation tank for containing said comminuted garbage slurry while said garbage ferments;
conduit means interconnecting said grinding means tank with the bottom of said closed anaerobic fermentation tank;
pump means associated with said conduit means for pumping the garbage slurry from said grinding means tank into said fermentation tank; and
second conduit means interconnecting said fermentation tank with said means for spraying a liquid against the internal walls of said hopper whereby alcohol generated in said fermentation tank can be utilized for spraying the garbage in said hopper to kill the pathogens therein.

4. Apparatus as claimed in claim 3 wherein said magnetic material removing means comprises:
an elongated endless belt extending under said hopper along the length thereof and passing into said passageway at one end of said hopper;
a plurality of magnets carried by said belt on the inner, enclosed surface thereof; and
scraping means bearing against the outer surface of said endless belt for removing magnetic materials adhering thereto as a result of the projection of said endless belt into said discharge passage.

5. Apparatus for fermenting refuse material comprising:
a hopper for receiving the material;
means adjacent the bottom of said hopper for removing magnetic materials from said refuse;
conveyor means in the bottom of the hopper for moving the refuse material toward one end of the hopper while converting the refuse to a soft, moist slurry;
a discharge passage at said one end of the hopper for permitting the refuse to be discharged therefrom;
a vertical tank positioned under said discharge passage for receiving the refuse as it gravitates from said hopper;
vertical partitions in said tank;
a grinding member rotatably mounted in the bottom of said vertical tank and cooperating with said partitions to effect comminution of said refuse;
a closed, anaerobic fermentation tank for containing said comminuted refuse slurry while said refuse ferments, said fermentation tank having an upper end and a lower end;
a conduit interconnecting said vertical tank with the lower end of said fermentation tank; and
pump means associated with said conduit for pumping the refuse slurry from said vertical tank into said closed fermentation tank.

References Cited by the Examiner
UNITED STATES PATENTS

| | | | |
|---|---|---|---|
| 1,030,169 | 6/1912 | Emery | 99—235 |
| 1,440,727 | 1/1923 | Faust | 195—40 |
| 1,602,029 | 10/1926 | Krempf | 195—3 |
| 1,717,100 | 6/1929 | Downes | 195—144 |
| 1,880,772 | 10/1932 | Buswell et al. | 195—144 |
| 2,058,175 | 10/1936 | Pinkerton et al. | 241—146 X |
| 2,178,818 | 11/1939 | Earp-Thomas | 195—142 X |
| 2,242,652 | 5/1941 | Maxwell | 210—4 |
| 2,343,706 | 3/1944 | Reich | 195—115 X |
| 2,458,431 | 1/1949 | Schlenz | 195—144 |
| 2,541,630 | 2/1951 | Yeomans | 210—2 |
| 2,588,182 | 3/1952 | Van Raust | 241—245 X |
| 2,734,803 | 2/1956 | Ruskin | 23—259.1 |
| 2,909,984 | 10/1959 | Rycraft et al. | 99—235 |
| 2,954,285 | 9/1960 | Carlsson et al. | 71—9 |
| 2,969,279 | 1/1961 | Pierson | 71—9 |
| 3,026,192 | 3/1962 | Tapin | 71—64 |

HYMAN LORD, *Acting Primary Examiner.*

A. LOUIS MONACELL, ABRAHAM H. WINKLESTEIN, *Examiners.*